(12) United States Patent
Fair et al.

(10) Patent No.: US 9,548,888 B1
(45) Date of Patent: Jan. 17, 2017

(54) TECHNIQUE FOR SETTING WWNN SCOPE FOR MULTI-PORT FIBRE CHANNEL SCSI TARGET DEDUPLICATION APPLIANCES

(71) Applicant: EMC Corporation, Hopkinton, MA (US)

(72) Inventors: Robert L. Fair, Cary, NC (US); Karunakara Rao Seelam, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 588 days.

(21) Appl. No.: 13/925,518

(22) Filed: Jun. 24, 2013

(51) Int. Cl.
*G06F 15/16* (2006.01)
*H04L 12/24* (2006.01)

(52) U.S. Cl.
CPC ....... *H04L 41/0803* (2013.01); *H04L 41/0893* (2013.01)

(58) Field of Classification Search
CPC .................................... H04L 41/0803
USPC ......................................... 709/220
See application file for complete search history.

(56) References Cited

U.S. PATENT DOCUMENTS

| | | | | |
|---|---|---|---|---|
| 8,793,352 B2* | 7/2014 | Bethune | ............. | H04L 41/0893 709/220 |
| 2005/0114476 A1* | 5/2005 | Chen | .................. | H04L 67/1097 709/220 |
| 2005/0114624 A1* | 5/2005 | Cervantes | ............. | G06F 3/0622 711/206 |
| 2007/0239944 A1* | 10/2007 | Rupanagunta | ........ | G06F 3/0613 711/147 |
| 2007/0276897 A1* | 11/2007 | Tameshige | ................ | G06F 8/61 709/201 |
| 2009/0094500 A1* | 4/2009 | Swekel | .................. | H03M 13/09 714/752 |
| 2011/0106923 A1* | 5/2011 | Bethune | ............. | H04L 41/0893 709/221 |
| 2011/0153715 A1* | 6/2011 | Oshins | .................. | G06F 9/5088 709/203 |
| 2011/0154318 A1* | 6/2011 | Oshins | ................ | G06F 9/45537 718/1 |
| 2012/0079195 A1* | 3/2012 | Bolen | ..................... | H04L 69/18 711/114 |

* cited by examiner

*Primary Examiner* — Richard G Keehn
(74) *Attorney, Agent, or Firm* — Blakely, Sokoloff, Taylor & Zafman LLP (57) ABSTRACT

A system and method for setting the World Wide Node Names (WWNNs) of a plurality of ports in a data storage system. In one embodiment, a method includes the operations of receiving a first request that is to set a plurality of WWNNs of a plurality of ports of the storage system, automatically generating a first WWNN in response to receiving the first request, and assigning the automatically generated first WWNN to a first port of the plurality so that the at least one SCSI device is visible over a Fiber Channel (FC) network as a target for SCSI requests at the first port assigned the first WWNN.

23 Claims, 6 Drawing Sheets

TECHNIQUE FOR SETTING WWNN SCOPE FOR MULTI-PORT FIBRE CHANNEL SCSI TARGET DEDUPLICATION APPLIANCES

BACKGROUND

Field

Embodiments of the present invention relate generally to data storage systems. More particularly, embodiments of the invention relate to data communicated across a Fibre Channel network.

Background Information

In modern computer systems, a file system stores and organizes computer files to enable a user to efficiently locate and access requested files. File systems can utilize a storage device such as a hard disk drive to provide local access or provide access to data stored on a remote file server. A file system can also be characterized as a set of abstract data types that are implemented for the storage, hierarchical organization, manipulation, navigation, access, and retrieval of data. The file system software is responsible for organizing files and directories.

Many companies and individuals with large amounts of stored data employ a file system as a data storage system. These data storage systems can be located local to the data to be backed up or at a remote site. The data storage systems can be managed by the entity controlling the data storage devices or a data storage service company. Data can be added to the storage system at any frequency and at any amount.

Data storage systems may offer storage for backup and disaster recovery. Transfer to remote storage may require the transfer of data over a network. One network that allows transferring data across a data storage system is a Fibre Channel (FC) network. Fibre Channel allows a server and/or a storage unit to be located at a substantial distance from other components of the data storage system if optical fiber is used as the physical medium. However, optical fiber is not required for shorter distances, as a Fibre Channel network may also be implemented using coaxial cable and ordinary telephone twisted pair.

A storage area network (SAN) that communicatively couples independent systems in a data storage system can be implemented with Fibre Channel networking. Independent systems in an FC SAN network are colloquially known as "nodes," which can be a client, a server, or a system that operates as both a client and a server.

In a typical distributed architecture, a node is communicatively coupled to a network with a host bus adapter (HBA). In an FC SAN network, the HBA of a node can be addressable through a World Wide Name (WWN). A WWN of an HBA can be, for example, a World Wide Node Name (WWNN), a World Wide Port Name (WWPN), or some combination thereof. A WWNN can identify a node in an FC SAN network and can be seen on many different ports of the node to identify the ports of the node as multiple network interfaces of that one node. In one example of an FC SAN network, a first node (e.g., a client) acts as a Small Computer System Interface (SCSI) initiator that issues SCSI requests to a SCSI target at a second node (e.g., a server) over an FC SAN network by addressing the second node using at least a WWNN assigned to one or more ports of an HBA at the second node.

BRIEF DESCRIPTION OF THE DRAWINGS

The invention may best be understood by referring to the following description and accompanying drawings that are used to illustrate embodiments of the invention. In the drawings.

DETAILED DESCRIPTION

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the Specification to "one embodiment" or "an embodiment" means that a particular feature, structure, or characteristic described in conjunction with the embodiment can be included in at least one embodiment of the invention. The appearances of the phrase "in one embodiment" in various places in the Specification do not necessarily all refer to the same embodiment.

Figure 1:
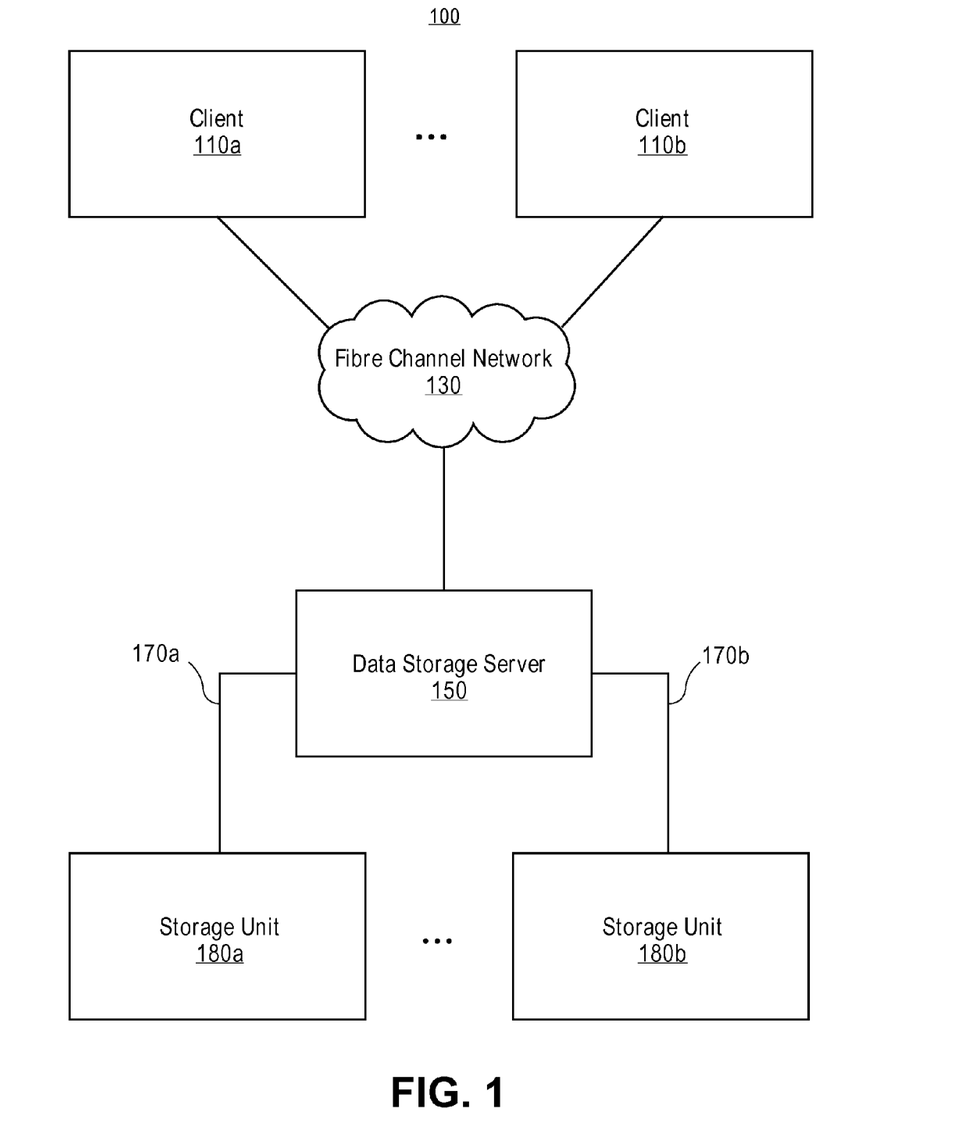
FIG. 1 is a block diagram of one embodiment of a data storage system.

FIG. 1 is a block diagram illustrating a data storage system 100 according to one embodiment of the invention. The data storage system 100 includes, but is not limited to, one or more client systems 110a-110b (i.e., nodes) communicatively coupled by a Fibre Channel (FC) network 130 with a server 150 (i.e., a node) connected with one or more storage units 180a-180b.

To efficiently transfer data within a data storage system, a request in a data storage system can be sent using a Small Computer System Interface (SCSI) request. SCSI requests traditionally specify a logical block address to be written to or to be read. These requests may be sent over the Fibre Channel network 130 by packaging the SCSI requests at a client 110 as Fibre Channel frames, and unpackaging the SCSI request at the server 150. Responses to SCSI requests may be likewise received over the Fibre Channel network 130.

A client 110 can be any type of client such as a personal computer (e.g., desktops, laptops, and tablets), a workstation, a handheld device, a Web-enabled appliance, a gaming device, a media player, or a mobile phone (e.g., Smartphone), or any computing system operable to communicate over the Fibre Channel network 130.

FC network 130 can be any type of network using Fibre Channel. In one embodiment, the FC network 130 is a storage area network (SAN). The FC network 130 can feature any suitable network topology. Thus, the FC network 130 can be a point-to-point network. Alternatively, the FC network 130 can be an arbitrated loop network. In another embodiment, the FC network 130 can be a switched fabric network. In such embodiments, the FC network 130 can include one or more Fibre Channel switches (not shown) and visibility of the server 150 and/or clients 110a-110b can be controlled with Fibre Channel zoning.

The server 150 can include any type of server or cluster of servers. For example, the server 150 can be a storage server used for any of various different purposes, such as to provide multiple users with access to shared data and/or to back up mission-critical data. The server 150 can be, for example, a file server (e.g., an appliance used to provide network-attached storage (NAS) capability), a block-based storage server (e.g., used to provide SAN capability), a unified storage device (e.g., one which combines NAS and SAN capabilities), a nearline storage device, a direct attached storage (DAS) device, a tape or virtual tap backup device, or essentially any other type of data storage device or a combination thereof. The server 150 can have a distributed architecture, or all of its components can be integrated into a single unit. The server 150 can be implemented as part of an archive and/or backup system such as a deduplication storage system available from EMC® Corporation of Hopkinton, Mass. Additionally, the server 150 can be communicatively coupled with an auxiliary storage system (not shown) similar to the server 150. The auxiliary storage system can duplicate the functionality of the server 150. Alternatively or in addition to the server 150, the auxiliary storage system can provide some additional data warehousing or data manipulation.

As shown in FIG. 1, the server 150 is coupled with one or more storage units 180a-180b. A storage unit 180 can be implemented locally (e.g., single-node operating environment) or remotely (e.g., multi-node operating environment) via an interconnect 170, which can be a bus or a network. In one embodiment, one of the storage units 180a-180b operates as an active storage unit to receive and store external or fresh data, while the other storage unit operates to periodically archive data from the active storage unit according to an archiving policy or scheme. A storage unit 180 can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. The storage units 180a-180b can also be combinations of such storage devices. In some embodiments, the storage units 180a-180b can be organized into one or more volumes of Redundant Array of Inexpensive Disks (RAID).

Figure 2:
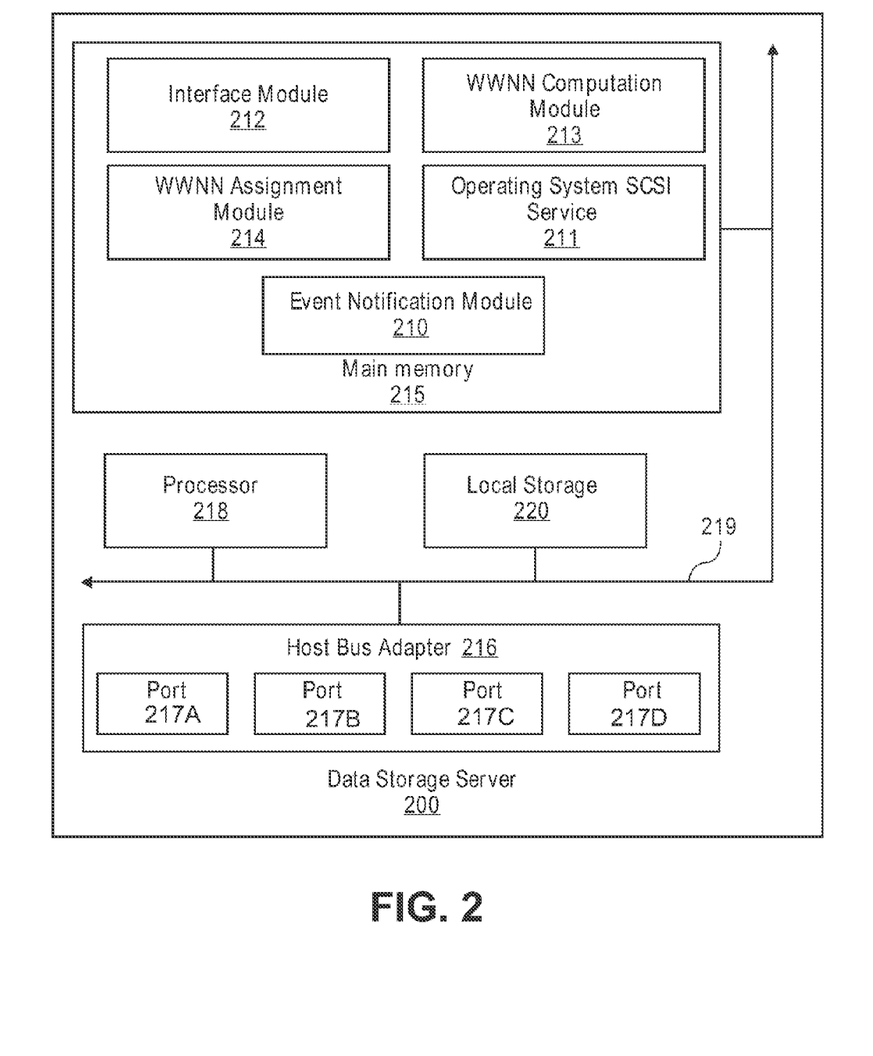
FIG. 2 is a block diagram of one embodiment of a server of a data storage system.

Turning to FIG. 2, an embodiment of a data storage server 200 is shown. The server 200 can be or can include the server 150 of FIG. 1 and can be coupled with one or more local or remote storage units (e.g., the storage units 180a-180b). The server 200 includes, but is not limited to, several components: including main memory 215, local storage 220, a processor 218, and a host bus adapter (HBA) 216. These components may be communicatively coupled through a bus 219. The bus 219 can be any subsystem adapted to transfer data within the server 220. The bus 219 can be a plurality of computer buses and include additional circuitry to transfer data.

The host bus adapter 216 is operable to receive the physical transmission of SCSI requests over an FC network (not shown) from a client (not shown). Though only one HBA 216 is illustrated, a server 200 can have more than one HBA. The HBA 216 includes a plurality of ports 217A-D. Multiple HBAs and/or multiple ports of the same HBA can be connected with multiple ports (either physical or virtual) of one or more client HBAs at a client.

The ports 217A-D can be physical, virtual, and/or a combination of both physical and virtual. Virtual ports can be implemented, for example, though N_Port ID virtualization (NPIV) so that multiple N_Port (i.e., node port) identifiers share a single physical N_Port—for example, where the ports 217A-D are virtual, the ports 217A-D can share the same physical port of the HBA 216.

The processor 218 can be any processor suitable to execute instructions of the components 211-214 illustrated in the main memory 215. Accordingly, the processor 218 can be, for example, a central processing unit (CPU), a microprocessor, or other similar processor. In some embodiments, the processor 218 includes a plurality of processors, such as a dedicated processor (e.g., a graphics processing unit), a network processor, or any processor suitable to execute operations of the server 200 connected with a client by a Fibre Channel network.

Coupled to the processor 218 is the main memory 215. The main memory 215 may offer both short-term and long-term storage and may in fact be divided into several units (including unit located at the processor 218). The main memory 215 can be volatile, such as static random access memory (SRAM) and/or dynamic random access memory (DRAM) and can provide storage (at least temporarily) of computer readable instructions, data structures, software applications, and other data for the server 200. Such data can be loaded from the local storage 220. The main memory 215 may also include cache memory, such as a cache located at the processor 218. The main memory 215 can include, but is not limited to, a number of modules that are configured to be executed by the processor 218: (1) an operating system (OS) SCSI service; (2) an interface module 212; (3) a World Wide Node Name Computation Module 213; (4) a World Wide Node Name Assignment Module 214; and (5) an event notification module 210.

The OS SCSI service 211 can include, but is not limited to, components operable to handle SCSI requests and responses using the HBA 216, such as the SCSI layers (e.g., SCSI interconnect layer, SCSI transport layer, other SCSI layers) and interrelated elements to appropriately route SCSI requests received from a client over an FC network and similarly return SCSI responses.

In one embodiment, the OS SCSI service 211 is operable to manage a SCSI-over-Fibre Channel configuration of the server 200. The OS SCSI service 211 can provide hardware management of the HBA 216, and can therefore include one or more drivers (e.g., a target-mode driver to provide a data path between a client and other SCSI layers of the OS SCSI service 211, and/or a virtual host bus driver to route SCSI requests from the OS SCSI service 211). One such driver can be for the HBA 216, so that SCSI devices can be advertised over an FC network. This driver can package SCSI responses as FC frames and unpackaged SCSI requests from FC frames and route the SCSI requests accordingly, such as by implementing Fibre Channel Protocol.

Additionally, the OS SCSI service 211 can provide logical management, such as mapping advertised logical unit numbers (LUNs), mapping LUNs to the World Wide Name of a port 217A-D, and the like. In one embodiment, the OS SCSI service 211 advertises one or more LUNs to a client over an FC network. A LUN can be advertised at one or more ports 217A-D of the HBA 216 and/or at other HBAs (not shown). A LUN can be mapped to a SCSI device created by the server (e.g., by the OS SCSI service 211). The OS SCSI service 211 can specify the advertisement of LUNs by the server 200, such as by specifying a client to which the LUN is to be advertised or specifying a port 217A-D of the HBA 216. The OS SCSI service 211 can also implement SCSI other communication functionality, such as sending a SCSI response to a SCSI report LUNs request.

All or part of the OS SCSI service 211 can be included in an operating system (not shown) that is operable to initiate the execution of the instructions provided by components 211-214 and/or manage hardware, such as input or output devices (not shown). The operating system may be adapted to perform other operations across the components of the server 200 including threading, resource management, data storage control and other similar functionality.

In addition to receiving SCSI requests through the OS SCSI service 211, the data storage server 200 is operable to receive requests from a client through the interface module 212. The interface module 212 can accept data across a network from a client. In one embodiment, a client sends one or more commands to the server 200 over a network according to the Transport Layer Security (TLS)/Secure Sockets Layer (SSL) or Secure Shell (SSH) protocol. The interface module 212 is configured to receive such a secure command and route the command to a suitable module 210-211, 213-214.

In the illustrated embodiment, the interface module 212 is shown as software that is executed by the processor 218 from the main memory 215. However, the interface module 212 can be implemented in hardware, software or a combination of the two. Thus, the interface module 212 can include, for example, components such as a network card, network access controller, and similar components designed to allow communication between remote systems over a network.

The interface module 212 is configured to distribute requests from a client to the World Wide Node Name (WWNN) computation module 213, among other modules 210-211, 214. Requests received by the interface module 212 and distributed to the WWNN computation module 213 include requests to set the WWNNs of the plurality of ports 217A-D according to a WWNN port scope, as well as other ports of additional HBAs (not shown). A request can include an indication of whether all ports 217A-D are to have the same WWNN or if all ports 217A-D are to have unique node names—that is, an indication that the WWNN port scope of the server 200 is to be global or port level, respectively.

In one embodiment, a request explicitly defines the WWNN port scope by specifying that the WWNN port scope is to be "global" (i.e., all ports 217A-D share a common WWNN) or "port" (i.e., all ports 217A-D have unique WWNNs). Alternatively, a request can indicate that the WWNN port scope is to be inverted—e.g., where each port has the same WWNN (i.e., the WWNN port scope is global), such a request would cause each port to have a unique WWNN (i.e., the WWNN port scope is port level).

In response to receiving a request to set the WWNNs of the plurality of ports 217A-D according to a WWNN port scope, the WWNN computation module 213 is configured to generate one or more WWNNs. The WWNN computation module 213 is configured to generate the WWNNs automatically and without user intervention, thereby reducing user interactions with the server 200 and the commensurate incidences of user error. For a request that indicates that the WWNN port scope is to be global, the WWNN computation module 213 is configured to generate a WWNN that is to be assigned to each port 217A-D so that all ports 217A-D are identifiable over an FC network with the same WWNN. Conversely, the WWNN computation module 213 is configured to generate a plurality of unique WWNNs in response to a request that indicates that the WWNN port scope is to be port level.

The WWNN computation module 213 can generate the one or more WWNNs according to an algorithm—for example, an algorithm adapted to generate a plurality (e.g., eight or sixteen) of hexadecimal octets, as WWNNs are commonly represented (where hexadecimal octets are delimited by colons). The algorithm may generate a WWNN that includes hexadecimal octets that follow a well-known naming convention, such as the a QLogic®, EMC®, Data Domain®, or other well-known naming convention. Additional hexadecimal octets can be generated from properties of the server 200 (e.g., a system identifier or other node identifier), properties of one or more ports (e.g., a port identifier, such as a WWPN), a property (e.g., a flag) that indicates whether the WWNN port scope should be global or port level, or a combination of these properties. In one embodiment, one or more hexadecimal octets can be randomly generated.

Before providing the one or more generated WWNNs to another module 210-212, 214, the WWNN computation module 213 can validate the generated WWNN(s) to ensure that no conflicts will exist. For example, the WWNN computation module can perform a check to ensure that the generated WWNN(s) do not conflict with any existing WWPNs for the ports 217A-D. Further, the WWNN computation module 213 may validate a hexadecimal octet, such as by confirming that the first nibble of the first hexadecimal octet conforms to an Institute of Electrical and Electronics Engineers (IEEE) and/or vendor-specific standard.

Once generated (and validated, if necessary), the one or more WWNNs are provided by the WWNN computation module 213 to the WWNN assignment module 214. The WWNN assignment module 214 is configured to assign the generated WWNN(s) to the plurality of ports 217A-D consistent with the WWNN port scope indicated by a request received by the interface module 212 (e.g., the client request which caused the WWNN computation module 213 to responsively generate the WWNN(s)). Once assigned a WWNN by the WWNN assignment module 214, a port 217 is identifiable with the assigned WWNN to a client over a network.

Like the WWNN computation module 213 (or in conjunction therewith), the WWNN assignment module 214 can be configured to perform validation operations before assigning a generated WWNN to a port 217. In one embodiment, the WWNN assignment module 214 is configured to evaluate a property associated with a port 217 (e.g., a flag) to determine if the WWNN for that port has been manually configured by a user. Where the evaluation indicates the user has manually set the WWNN of the port 217, then the WWNN assignment module 214 can be configured to ignore that port 217—i.e., the manually configured WWNN takes precedence over a generated WWNN that is to be automatically assigned by the WWNN assignment module 214. Thus, the ports 217A-D of the HBA 216 can include a combination of manually configured WWNNs and automatically generated and assigned WWNNs.

In addition to the configuration of the WWNN computation module 213, a WWNN that is to be assigned to a port 217 can be manually configured by a user in some embodiments. In such embodiments, the interface module 212 is configured to receive a request that includes a manually configured WWNN for a port 217. The interface module 212 is configured to provide this request to the WWNN assignment module 214, and the WWNN assignment module 214 is configured to assign the manually configured WWNN to the port 217 specified by the request. In one embodiment, the WWNN assignment module 214 is configured to override any WWNN automatically assigned to a port 217 in favor of a manually configured WWNN received as a user request though the interface module 212.

In one embodiment, the WWNN assignment module 214 assigns a generated WWNN to a port 217 as part of an identifier used to define a transport path over a network (e.g., an FC network) between the server 200 and a client (e.g., a connection between a host bus adapter at a client and the server HBA 216). In the aggregate, the transport path identifier can include a physical component and a logical component. The physical component includes an identifier of a port 217 at the server HBA 216 so that port can be identified by a client over a network. The physical path can include, for example, the assigned WWNN as well as a WWPN for a port 217. (n.b., the "physical" component can include a WWNN and/or WWPN for a virtual port.) The logical component can include a LUN or other identifier for a SCSI device advertised by the server 200 at a port 217.

In response to the assignment of one or more WWNNs to one or more ports 217A-D, the event notification module 210 can be configured to propagate the assignment through the server 200. The event notification module 210 can notify one or more processes (not shown), such as daemons, that the WWNN of a port 217 has been assigned. For example, a daemon (e.g., a service daemon for a virtual tape library (not shown)) can cache the WWNN or a property (e.g., an identifier) that includes the WWNN of a port 217. When the WWNN assignment module 214 assigns a WWNN to that port 217, the event notification module 210 notifies the daemon so that the cache can be updated. In another example, the event notification module 210 notifies a process to perform SAN zoning in response to a WWNN that is assigned to a port 217. This SAN zoning process can adjust visibility of the ports 217A-D and/or the SCSI devices that are advertised on those ports 217A-D to clients over a network.

Because a client exists remotely from the server 200 and the server 200 is visible to a client over a network, a change to a WWNN in the server may require reconfiguration at the client. Accordingly, the event notification module 210 is configured to provide notifications over a network to a client through the interface module 212 in some embodiments.

It should be appreciated that embodiments of the invention as will be hereinafter described may be implemented in conjunction with the execution of instructions by the processor 218 and/or other circuitry of the server 200. Particularly, circuitry of the server 200, including but not limited to the processor 218 can operate under the control of a program, routine, or the execution of instructions to execute methods or processes in accordance with embodiments of the invention. For example, a WWNN computation module 213 may be implemented in firmware, software (e.g., stored in main memory) or hardware and may be implemented by the processor 218 and/or other circuitry of the server 200. Further, it should be appreciated that the terms processor, microprocessor, circuitry, controller, etc., refer to any type of logic or circuitry capable of executing logic, commands, instructions, software, firmware, functionality and the like.

Figure 3A:
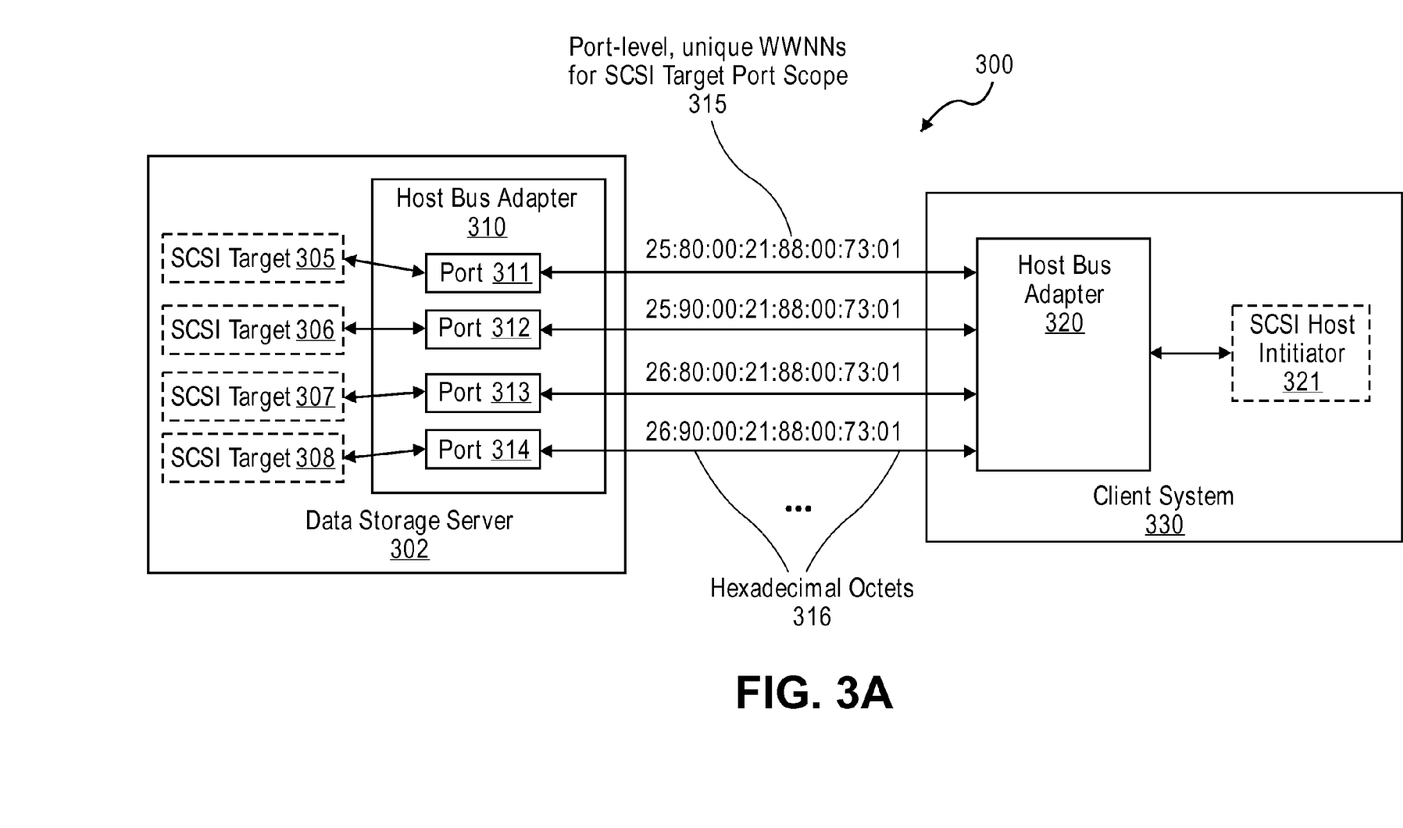
FIG. 3A is a block diagram of a data storage system including a server that is to advertise Small Computer System Interface devices to a client across ports that each has a unique World Wide Node Name, according to one embodiment of the invention.

With reference to FIG. 3A, a block diagram illustrates an embodiment of a data storage system 300 that includes a server 302 that is to advertise one or more SCSI target devices 305-308 to a client 330 across ports 311-314 that each has a unique WWNN for SCSI target 315 (each comprised of hexadecimal octets 316). The data storage system 300 can represent a conceptual embodiment of the data storage system 100 illustrated in FIG. 1. Therefore, the client 330 can be included in a client 110, the server 302 can be included in the server 150, and the unique WWNNs can be included as part of a transport path between the client 110/330 and the server 150/302 over the FC network 130.

In the illustrated embodiment, the server 302 advertises a plurality of SCSI target devices 305-308 to the client 330. The SCSI target devices 305-308 can be mapped to one or more LUNs that are advertised to the client 330. However, the SCSI target devices 305-308 are not necessarily physical devices, but rather destinations for data to be stored from the client 330. Thus, a LUN can be effectively a rendezvous point at the server 302 for SCSI requests sent from the client 330.

In this illustrated embodiment, each SCSI target device 305-308 is advertised on a respective port 311-314 (which can be physical or virtual) of the server HBA 310. Accordingly, the client 330 can view SCSI target devices 305-308 as destinations for the SCSI host initiator 321. In one embodiment, the SCSI host initiator 321 connects to the SCSI target devices 305-308 using transport paths over a network that each includes a LUN of a respective SCSI target device 305-308 and the unique WWNN for SCSI target 315 visible at a respective port 311-314.

The configuration of the server 302 to advertise the SCSI target devices 305-308 using unique WWNNs for each port 311-314 may be necessary for the configuration of the client 330. However, if the server 302 is initially configured to advertise the SCSI target devices 305-308 at ports 311-314 using the same WWNN, the client 330 may not correctly detect all ports. To address this error, the client 330 can issue a request to the server 302 that causes the server 302 to change the WWNN port scope for the ports 311-314 to port level. According to the client request, the server 302 advertises the SCSI target devices 305-308 to the client 330 across transport paths that include unique WWNNs.

Figure 3B:
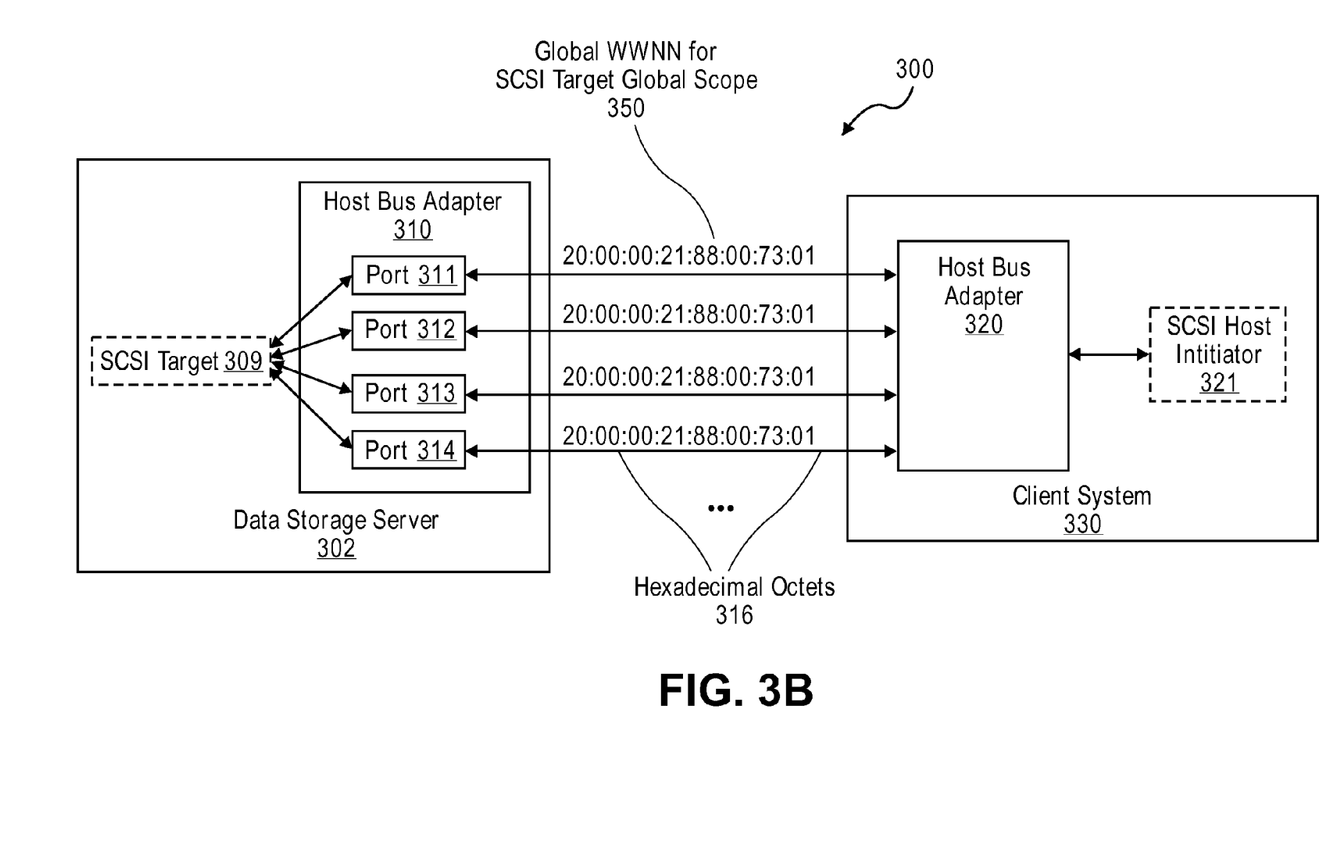
FIG. 3B is a block diagram of a data storage system including a server that is to advertise a Small Computer System Interface device to a client across ports that share a same World Wide Node Name.

Turning to FIG. 3B, an alternative embodiment to FIG. 3A is illustrated. Like FIG. 3A, FIG. 3B shows a block diagram of a data storage system 300 including a server 302 that is to advertise a SCSI target device 309 to a client across ports 311-312 of a server HBA 310. However, in FIG. 3B, the SCSI target device 309 is advertised to the client 330 at multiple ports 311-314 using the same (i.e., "global") WWNN (comprised of hexadecimal octets 316). Although the illustrated embodiment features only one SCSI target device 309, a plurality of SCSI devices can be advertised on the ports 311-314 using the global WWNN for SCSI target 350 (e.g., as shown in FIG. 3A). Thus, FIG. 3B is not to be construed as limiting, but is to illustrate that one SCSI target device 309 can be advertised at multiple ports 311-314 of the HBA 310.

In the illustrated embodiment, the server 302 advertises a SCSI target devices 309 to the client 330. Like the SCSI target devices 305-308, the SCSI target device 309 can be mapped to one LUN that is advertised to the client 330 and can be a rendezvous point at the server 302 for SCSI requests sent from the client 330 (as opposed to a physical SCSI device).

As shown, the SCSI target device 309 is advertised at multiple ports 311-314 of the server HBA 310. Accordingly, the client 330 can view SCSI target device 309 as a destination for requests from the SCSI host initiator 321. In one embodiment, the SCSI host initiator 321 connects to the SCSI target device 309 using a transport path over a network that includes a LUN of the SCSI target device 309 and the global WWNN for SCSI target 350 advertised at a respective port 311-314.

The configuration of the server 302 to advertise the SCSI target device 309 using a global WWNN for SCSI target 350 for each port 311-314 may be necessary for a particular configuration of the client 330. However, if the server 302 is initially configured to advertise the SCSI target device 309 at ports 311-314 using unique WWNNs, the client 330 may not correctly detect all ports and therefore may not have the transport paths to the SCSI target device 309 at multiple ports 311-314 available to it. To address this issue, the client 330 can issue a request to the server 302 that causes the server 302 to change the WWNN port scope for the ports 311-314 to global. According to the client request, the server 302 advertises the SCSI target device 309 to the client 330 across transport paths that include one global WWNN (although different WWPNs can be included in the transport paths).

Figure 4:
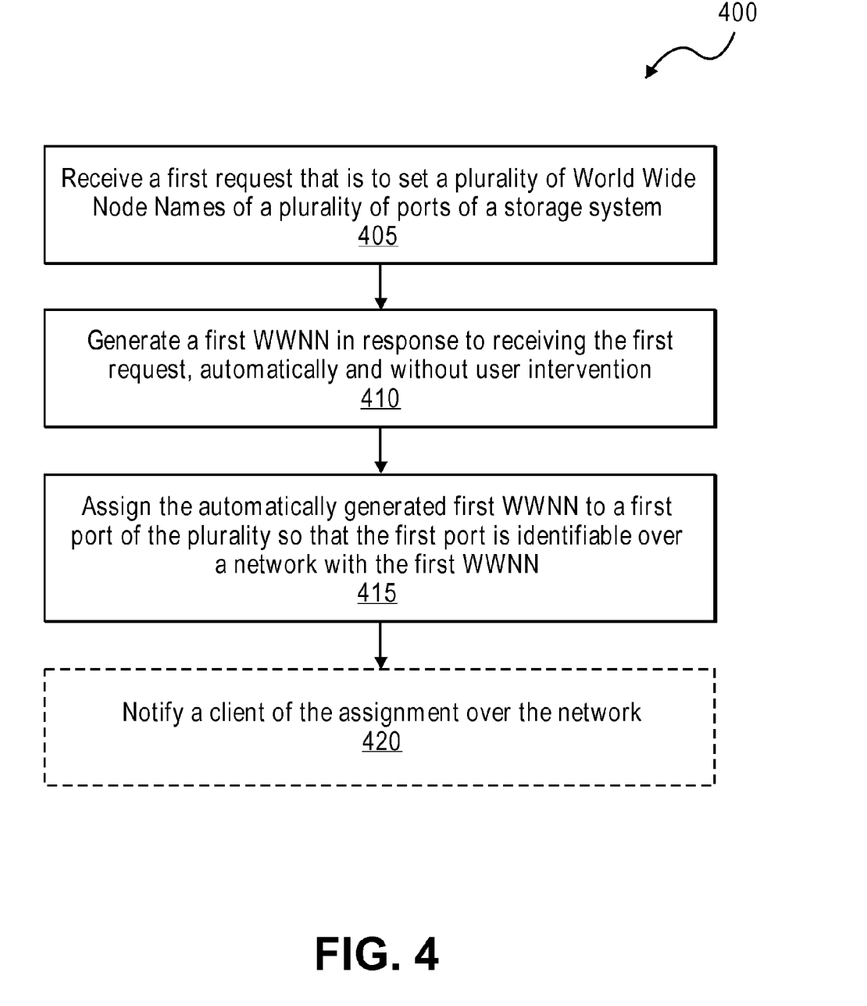
FIG. 4 is a flow diagram illustrating an embodiment of a method for setting a World Wide Node Name of a port so that port is identifiable over a network.

Turning now to FIG. 4, a flow diagram illustrates an embodiment of a method 400 for setting a WWNN of a port so that port is identifiable over a network. The method 400 can be performed by, for example, the server 150 of FIG. 1 communicatively coupled with a client 110 over an FC network 130. The server may be advertising one or more SCSI devices to the client as targets for data transfer. A SCSI device can be advertised at one or more ports of the server and addressable by a client using a transport path that includes a WWNN and a LUN of the SCSI device.

Beginning with operation 405, a first request is received at a server. This first request includes an indication of a WWNN port scope for one or more HBAs of the server. Generally, the first request is an indication that the WWNN port scope should be global—i.e., all ports of all HBAs at the server should share the same WWNN—or port level—i.e., all ports of all HBAs at the server should have unique WWNNs.

The first request can be received at the server over a network, which can be different from the network over which the server advertises SCSI devices to a client. In some embodiments a system other than the client (e.g., an administrative system) sends the first request to the server, although this first request still influences the advertisement of SCSI devices by the server to the client. The server can receive the first request over a network according to the Transport Layer Security (TLS)/Secure Sockets Layer (SSL) or Secure Shell (SSH) protocol.

In response to receiving the first request, the method 400 proceeds to operation 410. At operation 410, at least one WWNN is generated pursuant to the first request. At this operation 410, the WWNN is to be generated automatically and without user intervention. Therefore, the first request does not include a defined WWNN and may not even include any hexadecimal octets that are to be used in the generated WWNN.

In one embodiment, the WWNN can be generated in whole or in part according to an algorithm that uses one or more properties of the server, such as a system identifier, properties of the vendor, such as a vendor identifier, properties of the port to which the generated WWNN is to be assigned, such as a WWPN, a property that indicates whether the WWNN port scope is to be global or local, and/or other properties of the server and its constituent components.

Although the WWNN is generated, the WWNN can include one or more hexadecimal octets that are predetermined, such as three hexadecimal octets that follow a well-known naming convention (e.g., an EMC® or QLogic® naming convention). Further, the WWNN can be generated according to one or more requirements. In one embodiment, the first nibble of the first octet of a WWNN must be generated as a "2" (pursuant to the original Institute of Electrical and Electronics Engineers format), a "5," or a "6." In another embodiment, the first two octets of a WWNN can be generated as "10:00," which is also consistent with the original Institute of Electrical and Electronics Engineers format. After generation, the WWNN is validated before being assigned to one or more ports. In one embodiment, the WWNN is considered valid where it does not conflict with a WWPN for any port (whether physical or virtual).

Once the WWNN has been automatically generated, it is assigned to a first port at an HBA of the server performing the method 400, as shown at operation 415. With the automatically generated WWNN assigned to the first port of the server, that first port is addressable over a network with that WWNN. The automatically generated WWNN can be combined with other values so that a well-defined transport path is assigned to the first port. For example, the WWNN can be combined with a WWPN to form a physical component of the transport path and this physical component can be combined with a logical component that includes a LUN of a SCSI device that is advertised at the first port.

Following operation 415, the server performing the method 400 may need to notify one or more clients of the assignment. At operation 420, therefore, the server notifies a client of the assignment of the WWNN over the network that communicatively couples the server with the client. This notification can be, for example, a message that causes the client to update or otherwise change a SCSI initiator that the client uses to issue SCSI requests to the server. In one embodiment, this notification is unaware of the particular method of notification, but merely views a different WWNN over the network. For example, the server can indirectly notify the client by performing SAN zoning that dictates the visibility of ports to the client. According to the notification at operation 420, a client that is communicatively coupled with the server can issue SCSI requests to the advertised SCSI device using the transport path that includes the automatically generated WWNN.

Figure 5:
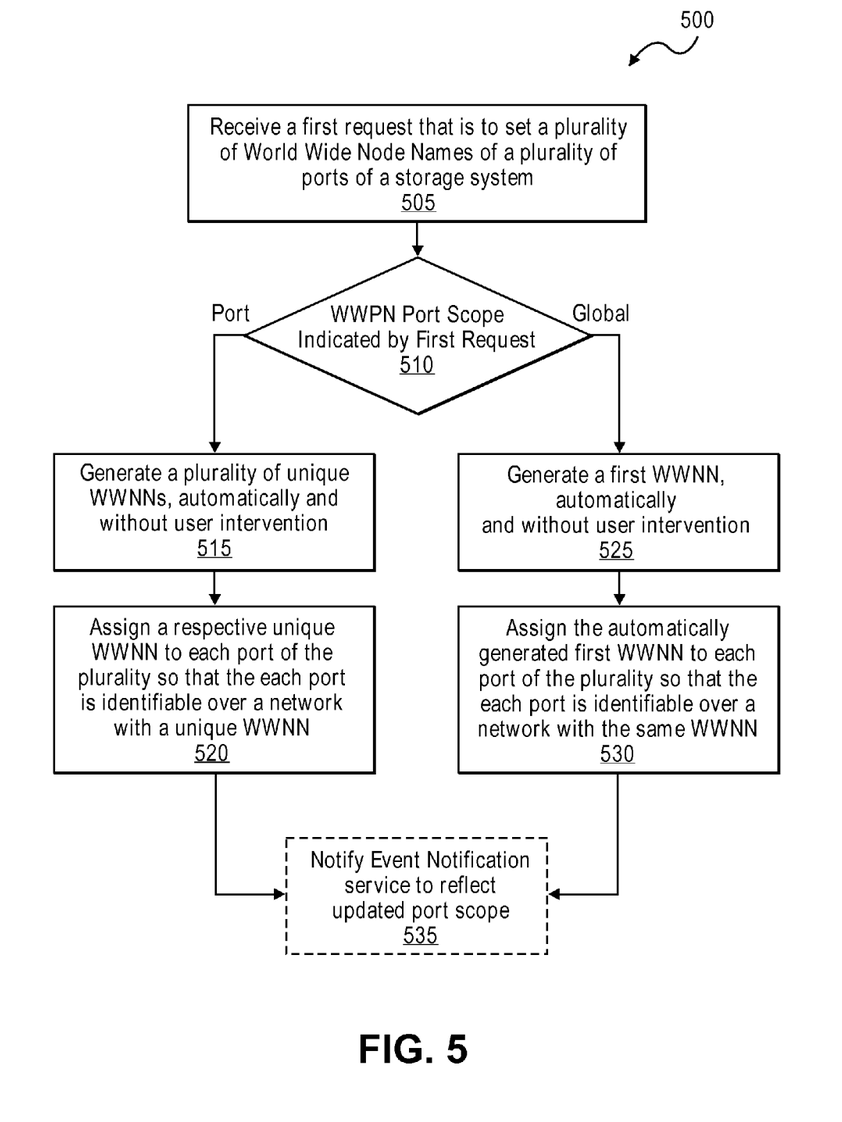
FIG. 5 is a flow diagram illustrating an embodiment of a method for setting the World Wide Node Names of a plurality of ports based on a defined WWNN port scope.

With respect to FIG. 5, a flow diagram illustrates an embodiment of a method 500 for setting the WWNNs of a plurality of ports based on a defined WWNN port scope. The method 500 can be performed by, for example, the server 150 of FIG. 1 communicatively coupled with a client 110 over an FC network 130. The server may be advertising one or more SCSI devices to the client as targets for data transfer. A SCSI device can be advertised at one or more ports of the server and addressable by a client using a transport path that includes a WWNN and a LUN of the SCSI device.

Beginning with operation 505, a first request is received at a server. This first request is a request to set a plurality of WWNNs of a plurality of ports of the server performing the method 500. The first request defines the WWNN port scope as either global, so that all ports of all HBAs at the server should share the same WWNN, or port level, so that each port of each HBA at the server has a unique WWNN.

Generally, this first request does not explicitly define all the octets that comprise a WWNN. Rather, the first request explicitly defines the WWNN port scope as global or port level, or the first request can define the WWNN port scope by requesting a switch from the existing WWNN port scope to the other WWNN port scope WWNN—i.e., from global to port level or vice versa.

As indicated at decision block 510, the first request defines the WWNN as selection from a binary option. Where the first request indicates that the WWNN port scope for the server performing the method 500 is to be port level, the method 500 proceeds to operation 515. At operation 515, a plurality of unique WWNNs is generated automatically and without user intervention. In this context, "unique" does not mean that each nibble of each octet is different from every other nibble in the same position of every other WWNN, but rather only each WWNN is different in the aggregate from every other WWNN of the plurality. In some embodiments, all of the WWNNs will have several octets that are the same—e.g., the first three octets of each WWNN may need to be uniform to satisfy a naming convention.

Once the plurality of unique WWNNs has been generated, each unique WWNN is assigned to a port of the server, as illustrated at operation 520. In one embodiment, a unique WWNN is assigned to each port that is addressable by a client communicatively coupled with the server over a network. Thus, a client identifies each port according to its unique WWNN, irrespective of whether that port is a physical port or a virtual port. The server can subsequently receive SCSI requests over a network (e.g., an FC network) from the client at the uniquely identified port.

One of ordinary skill in the art would understand that operations 515 and 520 do not necessarily occur sequentially. Rather, operations 515 and 520 can iteratively occur so that a unique WWNN is generated at operation 515 and then assigned to a port at operation 520 before the next unique WWNN is generated (again at operation 515).

Where the first request instead defines the WWNN port scope for the server as global, the method proceeds to operation 525. At operation 525, a WWNN is generated, automatically and without user intervention, that is suitable for each port of each HBA of the server. At subsequent operation 530, this global WWNN is assigned to each port of the server.

In one embodiment, a global WWNN identifies each port as belonging to the server to clients that are communicatively coupled with the server over a network. Accordingly, clients that are communicatively coupled with the server are able to issue SCSI requests to ports of the server and identify each of the visible ports as belonging to the same server (i.e., network node), irrespective of whether the ports are physical or virtual. The server can subsequently receive SCSI requests over a network (e.g., an FC network) from the clients at visible ports.

Unless the first request is received at the initialization of the server, switching the WWNN port scope of the server performing the method 500 may require updates to one or more server processes or network settings. Therefore, at operation 535 an event notification service at the server is notified of the updated WWNN port scope so that dependent processes and/or settings can be correspondingly updated. For example, a daemon that has one or more WWNNs cached can be notified so that the daemon's cache is refreshed to reflect the updated WWNNs. In one embodiment, the event notification service can issue messages to one or more clients communicatively coupled with the server indicating that the server has updated the WWNNs of its ports. In response, a client can update a SCSI host initiator to reflect the updated WWNNs so that the client can correctly address SCSI requests to a SCSI device advertised at a port of the server.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

One or more embodiments include an article of manufacture (e.g., a computer program product) that includes a computer-accessible and/or computer-readable medium. The medium may include a mechanism that provides, for example stores or transmits, information in a form that is accessible and/or readable by the computer. The computer-accessible and/or computer-readable medium may provide, or have stored thereon, a sequence of instructions that if executed by a computer cause or result in the computer performing one or more operations, methods, or techniques disclosed herein.

In one embodiment, the computer-readable medium may include a tangible non-transitory computer-readable storage media. For example, the tangible non-transitory computer-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more solid or tangible physical materials, such as, for example, a semiconductor material, a phase change material, a magnetic material, etc.

In another embodiment, the computer-readable media may include a non-tangible transitory computer-readable communication medium. For example, the transitory computer-readable communication medium may include electrical, optical, acoustical or other forms of propagated signals, such as carrier waves, infrared signals, digital signals, etc.)

Examples of suitable computers include, but are not limited to, computer systems, desktops, laptops, network elements, storage appliances, equipment of remote archive repositories, and other electronic devices, equipment, elements, or systems having one or more microprocessors. Such electronic devices typically include one or more processors coupled with one or more other components, such as one or more storage devices (non-transitory computer-readable storage media), user input/output devices (e.g., a keyboard, a touchscreen, and/or a display), and/or network connections. The coupling of the processors and other components is typically through one or more buses/interconnects and bridges (also termed bus controllers). Thus, the storage device of a given electronic device may store code and/or data for execution on the one or more processors of that electronic device.

It should also be appreciated that reference throughout this specification to "one embodiment," "an embodiment," or "one or more embodiments," for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method executed by a storage system, comprising:
    receiving a first request that is to set a plurality of World Wide Node Names (WWNNs) of a plurality of ports of a host bus adapter of the storage system at which are advertised at least one Small Computer System Interface (SCSI) device;
    generating, automatically and without user intervention, a plurality of WWNNs in response to receiving the first request; and
    assigning a first WWNN of the automatically generated plurality of WWNNs to a first port of the plurality of ports so that the at least one SCSI device is visible over a Fibre Channel (FC) network as a target for SCSI requests at the first port assigned the first WWNN, and assigning a second WWNN of the automatically generated plurality of WWNNs to a second port of the plurality of ports, wherein the second WWNN is different than the first WWNN.

2. The method of claim 1, further comprising:
    assigning the automatically generated first WWNN to all ports of the plurality of ports in response to an indication in the first request that a WWNN port scope of the storage system is to be global.

3. The method of claim 1, further comprising:
    generating, automatically and without user intervention, a plurality of unique WWNNs in response to an indication in the first request that a WWPN port scope of the storage system is to be port level; and
    assigning a respective unique, automatically generated WWNNs to each port of the plurality of ports so that each port is uniquely identifiable over the network with its respectively assigned WWNN.

4. The method of claim 3, further comprising:
    evaluating a property associated with a second port of the plurality of ports that indicates if a second WWNN for the second port has been manually configured by a user;
    assigning a new WWNN that has been automatically generated without user intervention to the second port where the evaluation of the property indicates that the second WWNN for the second port has not been manually configured by the user.

5. The method of claim 1, wherein the FC network is a Storage Area Network (SAN).

6. The method of claim 5, wherein the plurality of ports are virtual.

7. The method of claim 5, wherein the plurality of ports are a combination of physical and virtual.

8. The method of claim 1, wherein generating the first WWNN comprises:
    computing the first WWNN based on an algorithm that uses an identifier of the storage system and a property that indicates whether a scope of the storage system is global or port level.

9. The method of claim 1, wherein assigning the automatically generated first WWNN to the first port comprises:
    combining the automatically generated first WWNN with a logical unit number (LUN) associated with at least one SCSI device to create a path to which a SCSI initiator can address SCSI requests; and
    assigning the created path to the first port.

10. A non-transitory, computer-readable storage medium having instructions stored therein, which when executed by a computer, cause the computer to perform operations, the operations comprising:
    receiving a first request that is to set a plurality of World Wide Node Names (WWNNs) of a plurality of ports of a host bus adapter of the storage system at which are advertised at least one Small Computer System Interface (SCSI) device;
    generating, automatically and without user intervention, a plurality of WWNNs in response to receiving the first request; and
    assigning a first WWNN of the automatically generated plurality of WWNNs to a first port of the plurality of ports so that the at least one SCSI device is visible over a Fibre Channel (FC) network as a target for SCSI requests at the first port assigned the first WWNN, and assigning a second WWNN of the automatically generated plurality of WWNNs to a second port of the plurality of ports, wherein the second WWNN is different than the first WWNN.

11. The non-transitory, computer-readable storage medium of claim 10, wherein the operations further comprise:
    assigning the automatically generated first WWNN to all ports of the plurality of ports in response to an indication in the first request that a WWNN port scope of the storage system is to be global.

12. The non-transitory, computer-readable storage medium of claim 10, wherein the operations further comprise:
    generating, automatically and without user intervention, a plurality of unique WWNNs in response to an indication in the first request that a WWPN port scope of the storage system is to be port level; and
    assigning a respective unique, automatically generated WWNNs to each port of the plurality of ports so that each port is uniquely identifiable over the network with its respectively assigned WWNN.

13. The non-transitory, computer-readable storage medium of claim 10, wherein the FC network is a Storage Area Network (SAN).

14. The non-transitory, computer-readable storage medium of claim 13, wherein the plurality of ports are virtual.

15. The non-transitory, computer-readable storage medium of claim 13, wherein the plurality of ports are a combination of physical and virtual.

16. The non-transitory, computer-readable storage medium of claim 10, wherein generating the first WWNN comprises:
  computing the first WWNN based on an algorithm that uses an identifier of the storage system and a property that indicates whether a scope of the storage system is global or port level.

17. The non-transitory, computer-readable storage medium of claim 10, wherein assigning the automatically generated first WWNN to the first port comprises:
  combining the automatically generated first WWNN with a logical unit number (LUN) associated with at least one SCSI device to create a path to which a SCSI initiator can address SCSI requests; and
  assigning the created path to the first port.

18. A data storage system, comprising:
  a host bus adapter having a plurality of ports and configured for communication over a Fibre Channel (FC) network according to a Small Computer System Interface (SCSI) protocol; and
  a processor communicatively coupled with the host bus adapter, the processor to execute an interface module to receive requests to set a plurality of World Wide Node Names (WWNNs) of the plurality of ports, a WWNN computation module to automatically generate a plurality of WWNNs in response to receiving a first request, and a WWNN assignment module to assign a first WWNN of the automatically generated plurality of WWNNs to the plurality of ports based on a WWPN port scope that is defined by the first request, and to assign a second WWNN of the automatically generated plurality of WWNNs to a second port of the plurality of ports, wherein the second WWNN is different than the first WWNN.

19. The data storage system of claim 18, wherein the WWNN assignment module is configured to assign a same WWNN to each port of the plurality of ports where the port scope is defined as global.

20. The data storage system of claim 18, wherein the WWNN assignment module is configured to assign a respective unique WWNN of the plurality of generated WWNNs to each port of the plurality of ports where the port scope is defined as port level.

21. The data storage system of claim 18, wherein the plurality of ports are virtual ports.

22. The data storage system of claim 18, wherein the interface module is further configured to receive a second request that includes a manually configured WWNN that is to be assigned to a second port, and further wherein the WWNN assignment module is further configured to assign the manually configured WWNN to the second port.

23. The data storage system of claim 22, wherein the WWNN assignment module is further configured to evaluate a respective property associated with each port of the plurality of ports to determine if a respective WWNN of a respective port has been manually configured and is to assign a respective automatically generated WWNN to the respective port only where the respective property indicates that the respective port has not been manually configured.

* * * * *